(12) United States Patent
Wang (10) Patent No.: US 8,023,501 B1
(45) Date of Patent: Sep. 20, 2011

(54) TECHNIQUES FOR SELF-ORGANIZING ACTIVITY-DIFFUSION-BASED WIRELESS SENSOR NETWORK

(75) Inventor: Shu Wang, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 12/724,104

(22) Filed: Mar. 15, 2010

(51) Int. Cl.
*H04L 12/56* (2006.01)
*H04J 1/16* (2006.01)

(52) U.S. Cl. ............... 370/386; 370/252; 370/329

(58) Field of Classification Search ............ 370/386, 370/254, 329
See application file for complete search history.

(56) References Cited

U.S. PATENT DOCUMENTS 7,873,673 B2 * 1/2011 Cleveland et al. ............ 707/802

* cited by examiner

*Primary Examiner* — John Pezzlo
(74) *Attorney, Agent, or Firm* — Jefferson IP Law, LLP (57) ABSTRACT

Methods and wireless sensor nodes for aggregation-driven topology formation in a Wireless Sensor Network (WSN) are provided. A method for aggregation-driven topology formation in a WSN includes aggregating sensor data by one or more first sensor nodes, sending, by each of the one or more first sensor nodes, at least one activity diffusion message to each of at least one neighboring node of one or more second sensor nodes, wherein each activity diffusion message includes an activity diffusion weight, receiving, by each of the one or more second sensor nodes, respective of the at least one activity diffusion message from at least one neighboring node of the one or more first sensor nodes, accumulating, by each of the one or more second sensor nodes, activity diffusion weights included in the at least one activity diffusion message received from the at least one neighboring node of the one or more first sensor nodes, sending, by each of the one or more first sensor nodes, the aggregated data to at least one of the at least one neighboring node of the one or more second sensor nodes, and receiving, by the at least one of the at least one neighboring node of the one or more second sensor nodes, the aggregated data from respective of the one or more first sensor nodes.

40 Claims, 3 Drawing Sheets

TECHNIQUES FOR SELF-ORGANIZING ACTIVITY-DIFFUSION-BASED WIRELESS SENSOR NETWORK

BACKGROUND OF THE INVENTION

1. Field of the Invention

The present invention relates to a Wireless Sensor Network (WSN). More particularly, the present invention relates to techniques for a self-organizing activity-diffusion-based WSN.

2. Description of the Related Art

Recently, the concept of a Wireless Sensor Network (WSN) has received considerable attention. A WSN typically includes a collection of low-power transceivers (henceforth referred to as sensor nodes) each having some type of sensor function for one or more properties of an environment in which they are placed. The term "environment" here has a very broad meaning and could include any object or geographical area. Likewise, the range of properties which might be sensed is wide, and includes any property that may be indirectly or directly sensed, or determined based on the sensing of one or more other properties.

Each sensor node is capable of transmitting sensor data, usually as discrete packets, to any other devices in its vicinity, usually to another sensor node. By relaying data from one sensor node to another, the data can be directed to a so-called sink node or base station. The sensor node may be fixed or mobile, and the sink nodes may be fixed or mobile. Although the precise communication standard used by the sensor nodes of a WSN is not important, one suitable standard is Institute of Electrical and Electronics Engineers (IEEE) 802.15.4 standard, an implementation of which is referred to as ZigBee.

Depending upon the capabilities of the sink node, the data can be forwarded from the sink node directly or indirectly to some form of outside entity, typically via another network such as a mobile telephone network or the Internet. Where the sink node is able to communicate with another network it may also be referred to as a gateway.

In some implementations, the terms sink node, base station and gateway denote the same thing. In other implementations, the terms sink node, base station and gateway denote distinct functions, in which case, the sink node will communicate the gathered data to a separate base station and/or gateway for further transmission, possibly after some type of aggregation or other processing.

Moreover, in some implementations, the sensor nodes (or a subset thereof) are also capable of acting as the sink node. Multiple sink nodes, and multiple gateways, may be present in a WSN, but, for simplicity, a single sink node is assumed in the following description.

In the present disclosure, the terms "sink node" and "base station" are used synonymously to denote any type of data-gathering entity in a WSN, whether or not it also acts as a gateway.

The WSN differs from a wireless mesh network and an ad hoc network. Typically, the sensor nodes are unattended, have a low computational ability, and are reliant on battery power. Thus, power consumption of the sensor nodes is a major consideration and the transmission of data is typically the most power-hungry function of a sensor node. Therefore, the sensor nodes operate with severe energy constraints. However, the sensor nodes may be Radio Frequency IDentification (RFID)-based devices, which might not be reliant on battery power. Nevertheless, since the available transmission power of such devices is very low, similar considerations apply.

One technique employed to conserve battery power is to deactivate sensor nodes that are not currently engaged in sensing or communication (including relaying). Thus, sensor nodes may alternate between active and inactive states, for example, in response to the presence or absence of a sensed property or incoming data. In this way, the useful lifetime of the sensor can be prolonged.

Another technique employed to conserve battery power is to have sensor nodes only communicate with their nearest neighbors. However, by limiting the communication of sensor nodes to only their nearest neighbors, multi-hop techniques need to be used to enable sensor data to reach the sink node by several different routes. However, in employing this technique, the sensor nodes transmit data in all directions indiscriminately without knowing or caring which other nodes receive it. Accordingly, a WSN suffers from the transmission of redundant data.

Data aggregation has been put forward as a useful solution to address the limited energy constraints and redundant data. Data aggregation exploits the fact that a sensor node consumes less energy for data processing than for communication. Also, it minimizes the number of transmissions and thereby conserves energy. Instead of transmitting the packets of each individual sensor node separately, each sensor node first combines the incoming data from different sources en-route and then forwards the aggregated data to the next node when its aggregation interval is reached.

In a WSN, the interplay between topology formation and data aggregation is very important. Data aggregation schemes of the related art separate the topology formation and data aggregation from each other. In other words, a topology is formed first and then data aggregation is performed based on the topology. However, the pre-constructed topologies are not always the best structures for efficient data aggregation. An aggregation topology according to the related art will be discussed below with reference to FIG. 1.

Figure 1:
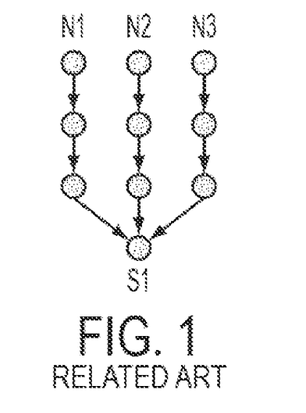
FIG. 1 illustrates an aggregation topology according to the related art.

FIG. 1 illustrates an aggregation topology according to the related art.

Referring to FIG. 1, the communication paths of sensor data collected by sensor nodes $N_1$, $N_2$ and $N_3$ and communicated to the sink node $S_1$ are shown. Here, the communication paths are formed based on the shortest paths for the data to travel between the sensor nodes $N_1$, $N_2$ and $N_3$ and the sink node $S_1$. The aggregation topology employed here is referred to as a shortest path tree. By following the shortest path, the packets from sensor nodes $N_1$, $N_2$ and $N_3$ are routed separately to the sink node $S_1$ and are not able to be aggregated en-route. In this case, this topology does not yield the most efficient result. Here, it would have been more efficient to perform data-aggregation and then have the aggregated data communicated to the sink node $S_1$.

Therefore, a need exists for a data-aggregation driven topology for efficient data aggregation.

SUMMARY OF THE INVENTION

An aspect of the present invention is to address at least the above-mentioned problems and/or disadvantages and to provide at least the advantages described below. Accordingly, an aspect of the present invention is to provide techniques for a self-organizing activity-diffusion-based Wireless Sensor Network (WSN).

In accordance with an aspect of the present invention, a method for aggregation-driven topology formation in a WSN is provided. The method includes aggregating sensor data by one or more first sensor nodes, sending, by each of the one or more first sensor nodes, at least one activity diffusion message to each of at least one neighboring node of one or more second sensor nodes, wherein each activity diffusion message includes an activity diffusion weight, receiving, by each of the one or more second sensor nodes, respective of the at least one activity diffusion message from at least one neighboring node of the one or more first sensor nodes, accumulating, by each of the one or more second sensor nodes, activity diffusion weights included in the at least one activity diffusion message received from the at least one neighboring node of the one or more first sensor nodes, sending, by each of the one or more first sensor nodes, the aggregated data to at least one of the at least one neighboring node of the one or more second sensor nodes, and receiving, by the at least one of the at least one neighboring node of the one or more second sensor nodes, the aggregated data from respective of the one or more first sensor nodes.

In accordance with another aspect of the present invention, a method for aggregation-driven topology formation in a WSN is provided. The method include aggregating sensor data by a first sensor node, sending, by the first sensor node, at least one activity diffusion message to each of at least one neighboring node of one or more second sensor nodes, wherein each activity diffusion message includes an activity diffusion weight, and sending, by the first sensor node, the aggregated data to at least one of the one or more second sensor nodes.

In accordance with yet another aspect of the present invention, a method for aggregation-driven topology formation in a WSN is provided. The method includes receiving, by a second sensor node, respective of at least one activity diffusion message from one or more first sensor nodes, wherein each activity diffusion message includes an activity diffusion weight, accumulating, by the second sensor node, activity diffusion weights included in the at least one activity diffusion messages received from the one or more first sensor nodes, and receiving, by second sensor node, aggregated data from respective at least one of the one or more first sensor nodes.

In accordance with still another aspect of the present invention, a WSN for aggregation-driven topology formation is provided. The WSN includes one or more first sensor nodes and one or more second sensor nodes. The one or more first sensor nodes aggregate sensor data, send at least one activity diffusion message to each of at least one neighboring node of one or more second sensor nodes, wherein each activity diffusion message includes an activity diffusion weight, and send the aggregated data to at least one of the at least one neighboring node of the one or more second sensor nodes. The one or more second sensor nodes receive respective of the at least one activity diffusion message from at least one neighboring node of the one or more first sensor nodes, accumulate activity diffusion weights included in the at least one activity diffusion message received from the at least one neighboring node of the one or more first sensor nodes, receive, by the at least one of the at least one neighboring node of the one or more second sensor nodes, the aggregated data from respective of the one or more first sensor nodes.

In accordance with another aspect of the present invention, wireless sensor node apparatus for aggregation-driven topology formation in a WSN is provided. The apparatus includes a transceiver for receiving and transmitting information, and a controller. The controller controls the transceiver, controls to aggregate sensor data, controls to send at least one activity diffusion message to each of at least one neighboring node of one or more other sensor nodes, wherein each activity diffusion message includes an activity diffusion weight, and controls to send the aggregated data to at least one of the one or more other sensor nodes.

In accordance with another aspect of the present invention, wireless sensor node apparatus for aggregation-driven topology formation in a WSN is provided. The apparatus includes a transceiver for receiving and transmitting information, and a controller. The controller controls the transceiver, controls to receive respective of at least one activity diffusion message from one or more other sensor nodes, wherein each activity diffusion message includes an activity diffusion weight, controls to accumulate activity diffusion weights included in the at least one activity diffusion messages received from the one or more other sensor nodes, and controls to receive aggregated data from respective at least one of the one or more other sensor nodes.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to techniques for a self-organizing activity-diffusion-based Wireless Sensor Network (WSN).

It should be understood that the following description might refer to terms utilized in various standards merely for simplicity of explanation. For example, the following description may refer to terms utilized in the Institute of Electrical and Electronics Engineers (IEEE) 802.15.4 standard. However, this description should not be interpreted limiting the present invention to application with the IEEE 802.15.4 standard. Independent of the mechanism used to implement a self-organizing activity-diffusion-based WSN, it is advantageous for that ability to conform to a standardized mechanism.

Exemplary embodiments of the present invention are hereafter described with a limited number and types of sensor nodes or limited use cases for ease of explanation. However, the present invention is equally applicable to an arbitrary number and types of nodes and other related use cases. Further, exemplary embodiments of the present invention are hereafter described under the assumption that the sensor nodes are location-aware. Herein, the sensor nodes may obtain their location information through the use of a Global Positioning System (GPS), distance or hop count techniques, or any other technique by which the sensor nodes may be aware of their location.

Exemplary embodiments of the present invention employ an activity diffusion technique to form aggregation-driven sensor node neighborhoods and encourage spatial aggregation (meet at the same place) and temporal aggregation (meet at the same time). In the activity diffusion technique, while all the sensor nodes act individually, from a global perspective, the sensor nodes cooperate to achieve efficient data aggregation. When the activity diffusion technique is implemented according to exemplary embodiments of the present invention, the resulting WSN is scalable, adaptive and robust.

In the activity diffusion technique, while a sensor node or group of sensor nodes are active and performing data aggregation, their activity will simultaneously influence their next-hop neighbor formation. More specifically, when a sensor node is in the aggregation status, its activity is diffused to its immediate neighborhoods, in a similar manner as a wavefront. An example of activity diffusion is discussed below with reference to FIG. 2.

Figure 2:
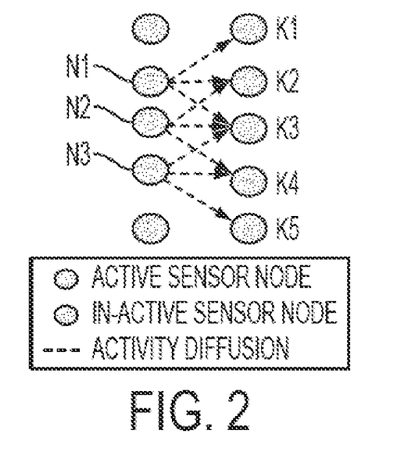
FIG. 2 illustrates activity diffusion according to an exemplary embodiment of the present invention.

FIG. 2 illustrates activity diffusion according to an exemplary embodiment of the present invention.

Referring to FIG. 2, sensor nodes $N_1$, $N_2$ and $N_3$ and sensor nodes $K_1$, $K_2$, $K_3$, $K_4$ and $K_5$ are shown. Here, as sensor nodes $N_1$, $N_2$ and $N_3$ perform data aggregation, they send activity diffusion messages to their next-hop neighborhoods. In this case, the activity diffusion messages are spread to sensor nodes $K_1$, $K_2$, $K_3$, $K_4$ and $K_5$. More specifically, sensor node $N_1$ sends an activity diffusion message to its neighbor sensor nodes $K_1$, $K_2$, and $K_3$, sensor node $N_2$ sends an activity diffusion message to its neighbor sensor nodes $K_2$, $K_3$, and $K_4$, and sensor node $N_3$ sends an activity diffusion message to its neighbor sensor nodes $K_3$, $K_4$, and $K_5$. Each of the activity diffusion messages includes an activity diffusion weight of the sensor node from which it was transmitted. In an exemplary embodiment of the present invention, the activity diffusion messages may include additional information. An example of a sensor node receiving activity diffusion messages is described below with reference to FIG. 3.

Figure 3:
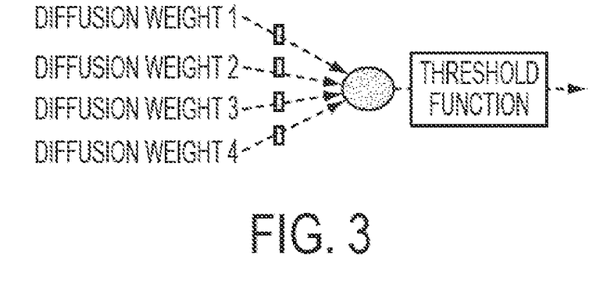
FIG. 3 illustrates a sensor node receiving activity diffusion messages according to an exemplary embodiment of the present invention.

FIG. 3 illustrates a sensor node receiving activity diffusion messages according to an exemplary embodiment of the present invention.

Referring to FIG. 3, activity diffusion weights 1, 2, 3 and 4 are sent in corresponding activity diffusion messages to an inactive sensor node in the next layer (i.e., a sensor node that is one hop closer to the sink node). When the sensor node in the next layer receives the activity diffusion messages, it accumulates the activity diffusion weights that are included in the activity diffusion messages. The accumulated activity diffusion weights are used to determine activity diffusion metrics of the sensor node. In this example, the activity diffusion metrics only include the accumulated activity diffusion weights. When the sensor node's activity diffusion metrics are greater than a threshold, it will become an aggregation candidate node.

When a sensor node in the previous layer finishes its data aggregation (i.e., its aggregation interval is almost reached), the sensor node selects its neighbor from the aggregation candidate nodes in the next layer. The higher the activity diffusion metrics an aggregation candidate node has, the higher the probability it will be chosen. The sensor node in the previous layer may determine which sensor nodes are aggregation candidate nodes and their corresponding activity diffusion metrics by sending a probe message to its next layer neighbors. In response to the probe message, the neighboring nodes send their current activity diffusion metrics. Here it is assumed that each node maintains a set of neighbor node addresses by exchanging address information with its neighbors. An example of aggregation-driven topology formation is described below with reference to FIG. 4.

Figure 4:
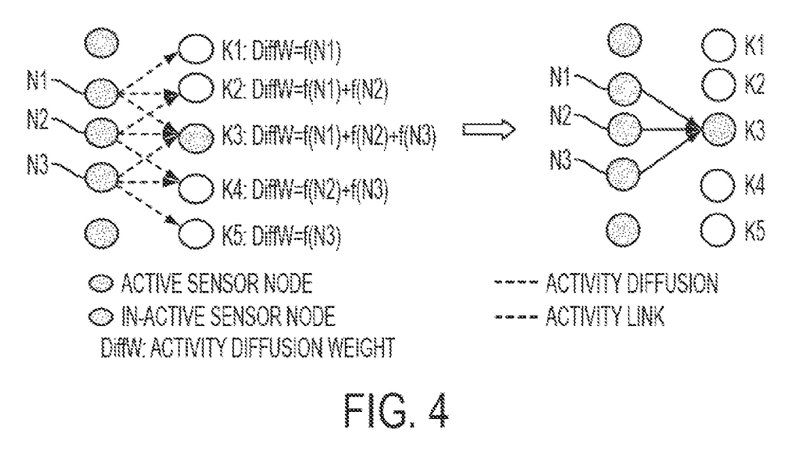
FIG. 4 illustrates aggregation-driven topology formation according to an exemplary embodiment of the present invention.

FIG. 4 illustrates aggregation-driven topology formation according to an exemplary embodiment of the present invention.

Referring to FIG. 4, sensor nodes $N_1$, $N_2$ and $N_3$ and sensor nodes $K_1$, $K_2$, $K_3$, $K_4$ and $K_5$ are shown. Here, sensor nodes $N_1$, $N_2$ and $N_3$ spread activity diffusion messages to sensor nodes $K_1$, $K_2$, $K_3$, $K_4$ and $K_5$ while performing data aggregation. The activity diffusion messages from sensor nodes $N_1$, $N_2$ and $N_3$ have the activity diffusion weights of $f(N_1)$, $f(N_2)$ and $f(N_3)$, respectively. More specifically, sensor node $N_1$ sends an activity diffusion message with an activity diffusion weight of $f(N_1)$ to its neighbor sensor nodes $K_1$, $K_2$, and $K_3$, sensor node $N_2$ sends an activity diffusion message with an activity diffusion weight of $f(N_2)$ to its neighbor sensor nodes $K_2$, $K_3$, and $K_4$, and sensor node $N_3$ sends an activity diffusion message with an activity diffusion weight of $f(N_3)$ to its neighbor sensor nodes $K_3$, $K_4$, and $K_5$. Each sensor node of the sensor nodes $K_1$, $K_2$, $K_3$, $K_4$ and $K_5$ in the next layer receives the activity diffusion messages and accumulates the activity diffusion weights to determine its activity diffusion metrics. After the activity diffusion weights are accumulated, sensor node $K_1$ has activity diffusion metrics with an accumulated activity diffusion weight of $f(N_1)$, sensor node $K_2$ has activity diffusion metrics with an accumulated activity diffusion weight of $f(N_1)+f(N_2)$, sensor node $K_3$ has activity diffusion metrics with an accumulated activity diffusion weight of $f(N_1)+f(N_2)+f(N_3)$, sensor node $K_4$ has activity diffusion metrics with an accumulated activity diffusion weight of $f(N_2)+f(N_3)$, and sensor node $K_5$ has activity diffusion metrics with an accumulated activity diffusion weight of $f(N_3)$.

When sensor node $N_1$, $N_2$, or $N_3$ finishes data aggregation and is ready to send its aggregated data, it chooses the neighbor (next-hop) node with the highest activity diffusion metrics. In this case, assuming that each of the activity diffusion messages $f(N_1)$, $f(N_2)$ and $f(N_3)$ are not negative, sensor node $K_3$ has the highest activity diffusion metrics with an accumulated activity diffusion weight of $f(N_1)+f(N_2)+f(N_3)$. By choosing sensor node $K_3$, spatial aggregation (meet at the same place) is achieved.

The activity diffusion weight sent by a node in an activity diffusion message may be based on any number of the same or different criteria. For example, the activity diffusion weight may be based on at least one of node aggregation history and path history of the aggregated data received by the node. Here, the activity diffusion weight sent by a sensor node, for aggregated data it received, may correspond to at least one of an amount of the aggregated data's aggregation history (e.g., the number of previous nodes from which aggregated data of those nodes are included) and a length of the aggregated data's path history (e.g., the number of hops the aggregated data has passed through). In this example, the activity diffusion weight sent out by the sensor node is larger if the amount of aggregation history is greater and/or the length of the path history is longer.

In order to address temporal aggregation (meet at the same time), each activity diffusion weight may have temporal information and may decay with time. For example, if sensor node $N_1$, $N_2$, or $N_3$ are active at about the same time, there will be a strong accumulated activity diffusion weight, and thus strong activity diffusion metrics, at sensor node $K_3$, which encourages the aggregation to meet at substantially the same time period.

In addition, instead of the activity diffusion metrics only including accumulated activity diffusion weights, the activity diffusion metrics may be determined by combining the accumulated activity diffusion weights with one or more other factors. An example of determining activity diffusion metrics using other factors is described below with reference to FIG. 5.

Figure 5:
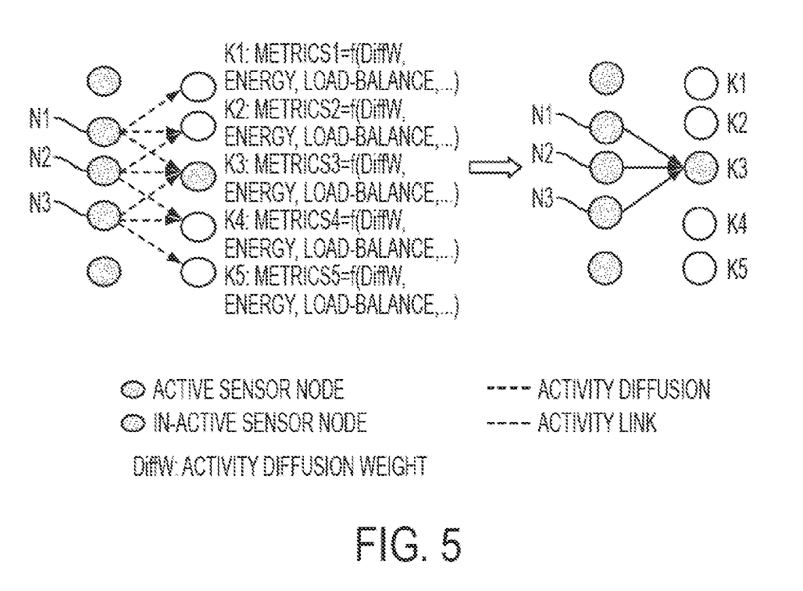
FIG. 5 illustrates the determination of activity diffusion metrics based on accumulated activity diffusion weights and other factors according to an exemplary embodiment of the present invention.

FIG. 5 illustrates the determination of activity diffusion metrics based on accumulated activity diffusion weights and other factors according to an exemplary embodiment of the present invention.

Referring to FIG. 5, sensor nodes $N_1$, $N_2$ and $N_3$ and sensor nodes $K_1$, $K_2$, $K_3$, $K_4$ and $K_5$ are shown. Here, sensor nodes $N_1$, $N_2$ and $N_3$ spread activity diffusion messages to sensor nodes $K_1$, $K_2$, $K_3$, $K_4$ and $K_5$ while performing data aggregation. More specifically, sensor node $N_1$ sends an activity diffusion message to sensor nodes $K_1$, $K_2$, and $K_3$, sensor node $N_2$ sends an activity diffusion message to sensor nodes $K_2$, $K_3$, and $K_4$, and sensor node $N_3$ sends an activity diffusion message to sensor nodes $K_3$, $K_4$, and $K_5$. Each sensor node of the sensor nodes $K_1$, $K_2$, $K_3$, $K_4$ and $K_5$ in the next layer receives the activity diffusion messages and accumulates the activity diffusion weights included in the activity diffusion messages. The accumulated activity diffusion weights are combined with one or more other factors to determine activity diffusion metrics. The one or more other factors may include one or more of node energy, a load-balance-factor, a node degree, etc.

Further, respective coefficients may be applied to any number of the components of the activity diffusion metrics, namely the accumulated activity diffusion weights and the one or more other factors. In one exemplary implementation, in order to emphasize the data aggregation factor, a higher coefficient may be applied to the accumulated activity diffusion weight (e.g., activity_metric_val=$C_a$*Activity Diffusion Weight+$C_b$*Energy Factor+ . . . +$C_x$*Factor X). In another example, if a sensor node has a higher energy, a high diffusion weight and a low traffic load, the sensor node is more likely to be chosen as a next-hop neighbor for routing and data aggregation. While there may be a respective coefficient applied to any number of the components of the activity diffusion metrics, there may alternatively or in addition be a coefficient commonly applied to the activity diffusion metrics.

When sensor node $N_1$, $N_2$, or $N_3$ finishes data aggregation and is ready to send its aggregated data, it chooses the neighbor (next-hop) node with the highest aggregation activity diffusion metrics. In this case, sensor node $K_3$ is assumed to have the highest activity diffusion metrics. By choosing sensor node $K_3$, spatial aggregation (meet at the same place) is achieved.

Still further, temporal aggregation (meet at the same time) may be employed such that each of the activity diffusion metrics may have temporal information and may decay with time. The temporal information may be associated with the activity diffusion metrics and/or one or more of the components of the activity diffusion metrics, namely the accumulated activity diffusion weights and/or one or more other factors.

In addition, instead of or in addition to using activity diffusion weights (and/or activity diffusion metrics) a sensor node may choose a next hop sensor node based on a connection history with one of the aggregation candidate nodes. For example, if a sensor node among aggregation candidate nodes is always (or frequently) selected as the next hop node, that node may be selected as the next hop node based on the connection history. Herein, the sensor node may retain a list of sensor nodes that are always (or frequently) selected as a next hop node. The list may further include information used to determine an order of the sensor nodes included in the list. The information may be used to select a sensor node from a plurality of aggregation candidate nodes that are included in the list. Similarly, the list may include sensor nodes that are never (or rarely) selected as a next hop node. In this case, a node on the list may not be selected to be selected as the next hop node based on the connection history.

In addition, a sensor node may limit its aggregation candidate nodes based on a connection history with one or more of its neighboring sensor nodes. For example, if a set of sensor nodes among neighboring sensor nodes is always (or frequently) selected as the aggregation candidate nodes and/or next hop nodes, those nodes may be selected as the aggregation candidate nodes (or a portion thereof) based on the connection history. Herein, the sensor node may retain a list of sensor nodes that are always (or frequently) selected as aggregation candidate nodes and/or next hop nodes. The list may further include information used to determine an order of the sensor nodes included in the list. The information may be used to select a smaller set of sensor nodes from a plurality of neighboring sensor nodes that are included in the list. Similarly, the list may include sensor nodes that are never (or rarely) selected as an aggregation candidate node and/or a next hop node. In this case, a node on the list may not be selected to be selected as the aggregation candidate node based on the connection history.

A structure of a sensor node will be described below with reference to FIG. 6.

Figure 6:
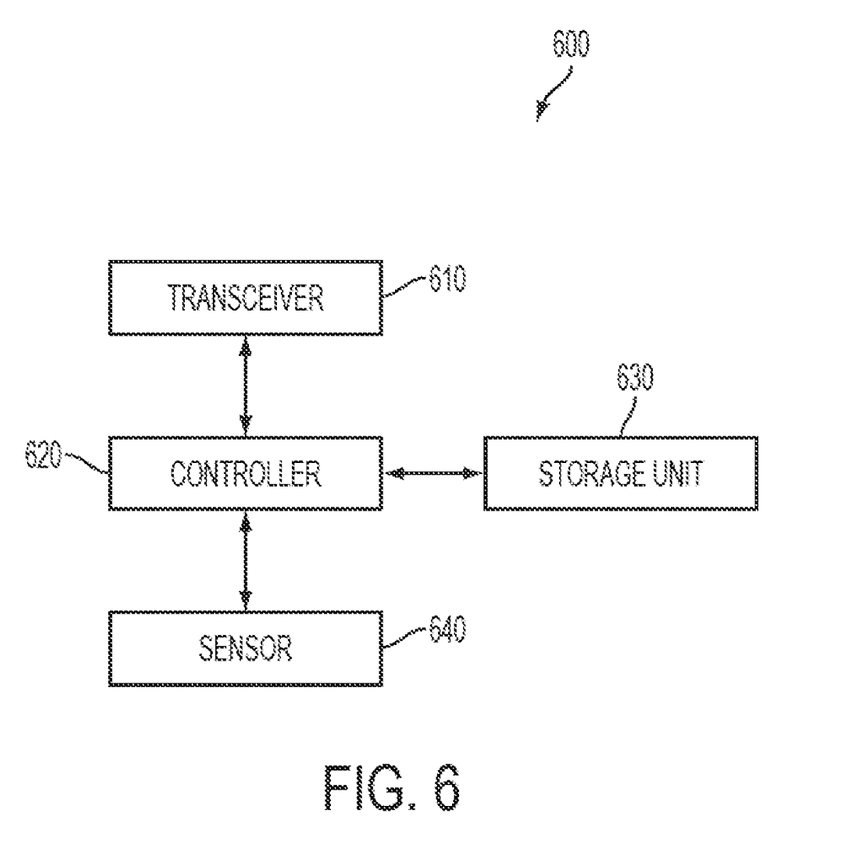
FIG. 6 is a block diagram illustrating a sensor node in a Wireless Sensor Network (WSN) according to an exemplary embodiment of the present invention.

FIG. 6 is a block diagram illustrating a sensor node in a WSN according to an exemplary embodiment of the present invention.

Referring to FIG. 6, the sensor node 600 includes a transceiver 610, a controller 620, a storage unit 630, and a sensor 640. The sensor node 600 may include any number of additional structural elements, such as a power supply, a battery, a housing, etc. However, a description of additional structural elements of the sensor node 600 is omitted for conciseness.

The transceiver 610 receives and transmits information from and to other sensor nodes via one or more communication mediums. The communication mediums may be any of Radio Frequency (RF) communications, communications via a capacitive coupling, communications via an inductive coupling, visible light communications, infrared communications, wired communications, or any other communications medium. The transceiver includes the appropriate hardware and/or software to communicate via the one or more communication mediums being employed, such as an antenna, a duplexer, a communication processor, an analog to digital convertor, a digital to analog convertor, a demodulator, a modulator, a decoder, a coder, etc. Further, the transceiver may include a plurality of transceivers. In addition, the transceiver may include at least one of a receiver and a transmitter.

The controller 620 controls overall operations of the sensor node 600. The operations of sensor node 600 include any of the operations explicitly or implicitly described herein as being performed by a sensor node. Further, the controller controls the operations of and communicates with the transceiver 610, storage unit 630 and sensor 640.

The storage unit 630 stores programs required for overall operations of the sensor node 600 and various data including any of the data discussed herein as being received, transmitted, retained or used by a sensor node.

The sensor 640 senses a range of properties. The sensor 640 may be omitted or deactivated in one or more sensor nodes of a WSN.

Thereby, exemplary embodiments of the present invention apply an activity diffusion technique to form a self-organizing aggregation driven WSN. When a node performs data aggregation, the node simultaneously spreads its activity diffusion messages to its neighbors in the next layer. The sensor nodes in the next layer accumulate the activity diffusion weights and become an aggregation candidate node if its diffusion metrics are greater than a threshold (e.g., when the accumulated activity diffusion weights are greater than a threshold). When the node in the previous layer finishes its data aggregation, the sensor node selects its neighbor from the aggregation candidate nodes in the next layer. By using the activity diffusion approach, an aggregation-driven topology is dynamically formed that encourages temporal and spatial data aggregation. In addition, exemplary embodiments of the present invention are advantageous in that they are scalable, yield adaptive and efficient aggregation, are self-organizing, and robust. More specifically, exemplary embodiments of the present invention are scalable in that the algorithm is decentralized and self-organized. Thus, the resulting WSN is scalable and easily provides for the addition of new nodes. The exemplary embodiments of the present invention yield adaptive and efficient aggregation in that an aggregation-driven topology is formed dynamically. Thus, the exemplary embodiments of the present invention are suitable for dynamic scenarios and for both static and mobile WSNs. The exemplary embodiments of the present invention are self-organizing in that each sensor node uses simple neighbor-to-neighbor interactions and all sensor nodes together achieve the goal of efficient data aggregation. The exemplary embodiments of the present invention are robust in that, since no fixed topology needs to be maintained, the WSN is robust to individual failures.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for aggregation-driven topology formation in a Wireless Sensor Network (WSN), the method comprising:
aggregating sensor data by one or more first sensor nodes;
sending, by each of the one or more first sensor nodes, at least one activity diffusion message to each of at least one neighboring node of one or more second sensor nodes, wherein each activity diffusion message includes an activity diffusion weight;
receiving, by each of the one or more second sensor nodes, respective of the at least one activity diffusion message from at least one neighboring node of the one or more first sensor nodes;
accumulating, by each of the one or more second sensor nodes, activity diffusion weights included in the at least one activity diffusion message received from the at least one neighboring node of the one or more first sensor nodes;
sending, by each of the one or more first sensor nodes, the aggregated data to at least one of the at least one neighboring node of the one or more second sensor nodes; and
receiving, by the at least one of the at least one neighboring node of the one or more second sensor nodes, the aggregated data from respective of the one or more first sensor nodes.

2. The method of claim 1, wherein each of the one or more first sensor nodes sends the activity diffusion message while aggregating the data.

3. The method of claim 1, wherein the one or more second sensor nodes comprise next-hop sensor nodes to the one or more first sensor nodes.

4. The method of claim 1, wherein the activity diffusion weight comprises at least one of a path history and an aggregation history.

5. The method of claim 1, wherein the activity diffusion weight comprises a temporal component that decays with time.

6. The method of claim 1, further comprising determining, by each of the one or more second sensor nodes, activity diffusion metrics by combining the accumulated activity diffusion weight with one or more other factors, wherein the accumulated activity diffusion weight and the one or more other factors comprise respective coefficients when combined.

7. The method of claim 1, further comprising:
sending, by each of the one or more first sensor nodes, a probe message to each of the at least one neighboring node of one or more second sensor nodes, wherein the probe message includes a request for information on activity diffusion metrics, and wherein the activity diffusion metrics are based on an accumulated activity diffusion weight;
receiving, by each of the one or more second sensor nodes, respective probe messages from the at least one neighboring node of the one or more first sensor nodes;
sending, by each of the one or more second sensor nodes, information on the activity diffusion metrics to the at least one neighboring node of the one or more first sensor nodes; and
receiving, by each of the one or more first sensor nodes, information on respective activity diffusion metrics of each of the at least one neighboring node of the one or more second sensor nodes.

8. The method of claim 1, further comprising:
determining, by each of the one or more first sensor nodes, at least one sensor node of the at least one neighboring node of the one or more second sensor nodes comprising a highest activity diffusion metrics,
wherein the at least one of the at least one neighboring node of the one or more second sensor nodes to which the aggregated data is sent comprises the at least one sensor node of the at least one neighboring node of the one or more second sensor nodes determined to comprise the highest activity diffusion metrics.

9. The method of claim 1, wherein the at least one neighboring node of the one or more second sensor nodes is a sensor node included in a connection history list of respective one or more first sensor nodes.

10. A method for aggregation-driven topology formation in a Wireless Sensor Network (WSN), the method comprising:
aggregating sensor data by a first sensor node;
sending, by the first sensor node, at least one activity diffusion message to each of at least one neighboring node of one or more second sensor nodes, wherein each activity diffusion message includes an activity diffusion weight; and
sending, by the first sensor node, the aggregated data to at least one of the one or more second sensor nodes.

11. The method of claim 10, wherein the first sensor node sends the activity diffusion message while aggregating the data.

12. The method of claim 10, wherein the one or more second sensor nodes comprise next-hop sensor nodes to the first sensor node.

13. The method of claim 10, wherein the activity diffusion weight comprises a temporal component that decays with time.

14. The method of claim 10, further comprising:
sending, by the first sensor node, a probe message to each of the one or more second sensor nodes, wherein the probe message includes a request for information on activity diffusion metrics, wherein the activity diffusion metrics are based on a combination of an accumulated activity diffusion weight and one or more other factors, and wherein the accumulated activity diffusion weight and the one or more other factors comprise respective coefficients when combined; and
receiving, by the first sensor node, information on respective activity diffusion metrics of each of the one or more second sensor nodes.

15. The method of claim 10, further comprising:
determining, by the first sensor node, at least one sensor node of the one or more second sensor nodes comprising a highest activity diffusion metrics,
wherein the at least one of the one or more second sensor nodes to which the aggregated data is sent comprises the at least one sensor node of the one or more second sensor nodes determined to comprise the highest activity diffusion metrics.

16. A method for aggregation-driven topology formation in a Wireless Sensor Network (WSN), the method comprising:
receiving, by a second sensor node, respective of at least one activity diffusion message from one or more first sensor nodes, wherein each activity diffusion message includes an activity diffusion weight;
accumulating, by the second sensor node, activity diffusion weights included in the at least one activity diffusion messages received from the one or more first sensor nodes; and
receiving, by second sensor node, aggregated data from respective at least one of the one or more first sensor nodes.

17. The method of claim 16, wherein the second sensor node comprises a next-hop sensor node to the one or more first sensor nodes.

18. The method of claim 16, wherein the activity diffusion weight comprises a temporal component that decays with time.

19. The method of claim 16, further comprising:
receiving, by the second sensor node, respective probe messages from at least one of the one or more first sensor nodes, wherein each of the probe messages includes a request for information on activity diffusion metrics, wherein the activity diffusion metrics are based on a combination of an accumulated activity diffusion weight and one or more other factors, wherein the accumulated activity diffusion weight and the one or more other factors comprise respective coefficients when combined; and
sending, by the second sensor node, information on the activity diffusion metrics to the at least one of the one or more first sensor nodes.

20. The method of claim 16, wherein the second sensor node comprises a highest activity diffusion metrics among sensor nodes receiving the at least one activity diffusion message from respective at least one of the one or more first sensor nodes.

21. A Wireless Sensor Network (WSN) for aggregation-driven topology formation, the WSN comprising:
one or more first sensor nodes for aggregating sensor data, for sending at least one activity diffusion message to each of at least one neighboring node of one or more second sensor nodes, wherein each activity diffusion message includes an activity diffusion weight, and for sending the aggregated data to at least one of the at least one neighboring node of the one or more second sensor nodes; and
the one or more second sensor nodes for receiving respective of the at least one activity diffusion message from at least one neighboring node of the one or more first sensor nodes, for accumulating activity diffusion weights included in the at least one activity diffusion message received from the at least one neighboring node of the one or more first sensor nodes; and for receiving, by the at least one of the at least one neighboring node of the one or more second sensor nodes, the aggregated data from respective of the one or more first sensor nodes.

22. The WSN of claim 21, wherein each of the one or more first sensor nodes sends the activity diffusion message while aggregating the data.

23. The WSN of claim 21, wherein the one or more second sensor nodes comprise next-hop sensor nodes to the one or more first sensor nodes.

24. The WSN of claim 21, wherein the activity diffusion weight comprises at least one of a path history and an aggregation history.

25. The WSN of claim 21, wherein the activity diffusion weight comprises a temporal component that decays with time.

26. The WSN of claim 21, wherein each of the one or more second sensor nodes determine activity diffusion metrics by combining the accumulated activity diffusion weight with one or more other factors, wherein the accumulated activity diffusion weight and the one or more other factors comprise respective coefficients when combined.

27. The WSN of claim 21, wherein each of the one or more first sensor nodes sends a probe message to each of the at least one neighboring node of one or more second sensor nodes, wherein the probe message includes a request for information on activity diffusion metrics, and wherein the activity diffusion metrics are based on an accumulated activity diffusion weight, and receive information on respective activity diffusion metrics of each of the at least one neighboring node of the one or more second sensor nodes, and
   wherein each of the one or more second sensor nodes receive respective probe messages from the at least one neighboring node of the one or more first sensor nodes, and send information on the activity diffusion metrics to the at least one neighboring node of the one or more first sensor nodes.

28. The WSN of claim 21, wherein each of the one or more first sensor nodes determine at least one sensor node of the at least one neighboring node of the one or more second sensor nodes comprising a highest activity diffusion metrics, and
   wherein the at least one of the at least one neighboring node of the one or more second sensor nodes to which the aggregated data is sent comprises the at least one sensor node of the at least one neighboring node of the one or more second sensor nodes determined to comprise the highest activity diffusion metrics.

29. The WSN of claim 21, wherein the at least one neighboring node of the one or more second sensor nodes is a sensor node included in a connection history list of respective one or more first sensor nodes.

30. A wireless sensor node apparatus for aggregation-driven topology formation in a Wireless Sensor Network (WSN), the apparatus comprising:
   a transceiver for receiving and transmitting information; and
   a controller for controlling the transceiver, for controlling to aggregate sensor data, for controlling to send at least one activity diffusion message to each of at least one neighboring node of one or more other sensor nodes, wherein each activity diffusion message includes an activity diffusion weight, and for controlling to send the aggregated data to at least one of the one or more other sensor nodes.

31. The apparatus of claim 30, wherein the controller controls to send the activity diffusion message while aggregating the data.

32. The apparatus of claim 30, wherein the one or more other sensor nodes comprise next-hop sensor nodes to the first sensor node.

33. The apparatus of claim 30, wherein the activity diffusion weight comprises a temporal component that decays with time.

34. The apparatus of claim 30, wherein the controller further controls to sending a probe message to each of the one or more other sensor nodes, wherein the probe message includes a request for information on activity diffusion metrics, wherein the activity diffusion metrics are based on a combination of an accumulated activity diffusion weight and one or more other factors, and wherein the accumulated activity diffusion weight and the one or more other factors comprise respective coefficients when combined, and
   wherein the controller further controls to receive information on respective activity diffusion metrics of each of the one or more other sensor nodes.

35. The apparatus of claim 30, wherein the controller further controls to determine at least one sensor node of the one or more other sensor nodes comprising a highest activity diffusion metrics, and
   wherein the at least one of the one or more other sensor nodes to which the aggregated data is sent comprises the at least one sensor node of the one or more other sensor nodes determined to comprise the highest activity diffusion metrics.

36. A wireless sensor node apparatus for aggregation-driven topology formation in a Wireless Sensor Network (WSN), the apparatus comprising:
   a transceiver for receiving and transmitting information; and
   a controller for controlling the transceiver, for controlling to receive respective of at least one activity diffusion message from one or more other sensor nodes, wherein each activity diffusion message includes an activity diffusion weight, for controlling to accumulate activity diffusion weights included in the at least one activity diffusion messages received from the one or more other sensor nodes, and for controlling to receive aggregated data from respective at least one of the one or more other sensor nodes.

37. The apparatus of claim 36, wherein the second sensor node comprises a next-hop sensor node to the one or more other sensor nodes.

38. The apparatus of claim 36, wherein the activity diffusion weight comprises a temporal component that decays with time.

39. The apparatus of claim 36, wherein the controller further controls to receive respective probe messages from at least one of the one or more other sensor nodes, wherein each of the probe messages includes a request for information on activity diffusion metrics, wherein the activity diffusion metrics are based on a combination of an accumulated activity diffusion weight and one or more other factors, wherein the accumulated activity diffusion weight and the one or more other factors comprise respective coefficients when combined; and
   wherein the controller further controls to send information on the activity diffusion metrics to the at least one of the one or more other sensor nodes.

40. The apparatus of claim 36, wherein the second sensor node comprises a highest activity diffusion metrics among sensor nodes receiving the at least one activity diffusion message from respective at least one of the one or more other sensor nodes.

* * * * *